United States Patent [19]
Nielsen

[11] Patent Number: 5,133,382
[45] Date of Patent: Jul. 28, 1992

[54] PRIMARY VALVE ACTUATOR ASSEMBLY

[75] Inventor: Wyn Y. Nielsen, La Jolla, Calif.

[73] Assignee: Solatrol, Inc., San Diego, Calif.

[21] Appl. No.: 532,171

[22] Filed: May 25, 1990

Related U.S. Application Data

[63] Continuation of Ser. No. 393,994, Aug. 15, 1989, abandoned.

[51] Int. Cl.[5] .............................................. F16K 31/12
[52] U.S. Cl. .................................. 137/549; 251/30.02
[58] Field of Search ........................ 251/30.02; 137/549

[56] References Cited

U.S. PATENT DOCUMENTS

| | | | |
|---|---|---|---|
| 2,439,523 | 4/1948 | Miller et al. | 251/30.02 |
| 2,899,972 | 8/1959 | Matthews | 251/30.02 |
| 2,936,780 | 5/1960 | Pratt | 137/549 |
| 3,368,582 | 2/1968 | Kozel et al. | 137/549 |
| 4,094,337 | 6/1978 | Robinson | 251/368 |
| 4,282,897 | 8/1981 | de Mey, II | 251/368 |

FOREIGN PATENT DOCUMENTS 1439913  6/1976  United Kingdom ............. 251/30.02

OTHER PUBLICATIONS

"Magnelatch Option" manufacture's manual pp. 16.6, 16.7 of Skinner Valve Options, Skinner Electric Valve Division, New Briton, Connecticut, U.S.A. 1989.

*Primary Examiner*—A. Michael Chambers
*Attorney, Agent, or Firm*—William C. Fuess

[57] ABSTRACT

An electronically operated primary valve actuation assembly is disclosed for use on a fluid valve in an irrigation system that can be run solely by ambient light energy. In operation, water passes from the high pressure side of a fluid valve through a filter assembly which removes particles as small as 0.002 inches. The microfilter assembly also has a magnet which further removes magnetic particles. As water exits the filter assembly it enter a microvalve actuation assembly which has two microvalves with valve inlet holes approximately 0.013 inches in diameter. It is necessary to filter the water to keep the microvalve holes from clogging. The microvalves are arranged such that when one valve is open the other valve is closed and vice versa. The microvalves require only a small amount of force to open or close the microvalve against high water pressure normally encountered in an irrigation system. Opening and closing the two microvalves causes the main fluid valve to open and close. The small force requirements to open and close the microvalves allows for use of a power efficient electromagnetic scheme for operating the microvalve. This in turn allows the fluid valves to be used in an irrigation system that is energized solely by ambient light.

19 Claims, 6 Drawing Sheets

PRIMARY VALVE ACTUATOR ASSEMBLY

This is a continuation of co-pending application Ser. No. 07/393,994, filed on Aug. 15, 1989, now abandoned.

CROSS REFERENCE TO RELATED APPLICATIONS

This application is related to an application entitled "ELECTRICAL SPLICE ASSEMBLY" Ser. No. 334,040 by inventor Wyn Y. Nielsen filed on Apr. 4, 1989, now U.S. Pat. No. 4,973,263 issued Nov. 27, 1990 which is hereby incorporated by this reference. This application is also related to a U.S. patent application entitled "HIGH EFFICIENCY, FLUX-SWITCHED, ELECTROMAGNETIC ACTUATOR" Ser. No. 07/388,059, here incorporated by reference, by inventor, Wyn Y. Nielsen filed on Jul. 31, 1989. This application is also related to a U.S. patent application entitled "LIGHT-ENERGIZED ELECTRONICS ENERGY MANAGEMENT SYSTEM" Ser. No. 253,858 by inventors Wyn Nielsen and Jonathan Luck, filed on Oct. 4, 1988, which is hereby incorporated by this reference.

BACKGROUND

The invention is related to a primary actuator assembly for fluid valves such as those used in sprinkler or irrigation systems. More particularly, existing fluid valves known as "three-way" primary actuated diaphragm valves, such as those manufactured by Buckner, Inc., use a solenoid actuation assembly that causes the high pressure water from the high pressure side of the valve to close the valve and the difference between atmospheric pressure or valve outlet pressure and the inlet pressure to open the valve. In a typical arrangement, there is an opening in the high pressure side of the fluid line which is connected to a solenoid inlet valve. When the solenoid is in the de-energized position, the solenoid inlet valve is open and allows high pressure water to pass through the solenoid inlet valve and enter a solenoid chamber that is connected to a diaphragm chamber in the fluid valve. Thus connected, the diaphragm chamber is at the same pressure as the high pressure side of the fluid line. The area of the diaphragm presented to the diaphragm chamber is larger than the main seal seat area presented to the high pressure side of the closed valve. This difference in area creates a pressure bias force, which, in conjunction with a bias force from a spring in the diaphragm chamber, act to hold the diaphragm in the closed position and keep the valve closed.

To open the fluid valve, the solenoid is activated which closes the solenoid inlet valve and opens a solenoid outlet valve. The solenoid outlet valve is connected by a channel running through the center of the solenoid to the diaphragm chamber of the fluid valve. This reduces the pressure in the diaphragm chamber to atmospheric pressure. The pressure imbalance between the diaphragm chamber and the high pressure side of the valve causes the valve to open and remain open as long as the solenoid is energized. In typical valves manufactured by Buckner, Inc. for example, it takes approximately 8 watts of power to energize the solenoid and keep it open. The energized solenoid produces approximately 1.27 pounds of force, in addition to the force necessary to overcome the solenoid return spring, to close the solenoid inlet valve and open the outlet valve against as much as 200 psi of water pressure (assuming solenoid valve orifice diameters of 0.090"). When the solenoid is de-energized, a solenoid spring causes a solenoid plunger to reverse direction and open the solenoid inlet valve and close the solenoid outlet valve. This causes, as previously described, the diaphragm chamber to be connected to the high pressure side of the fluid line which in turn causes the fluid valve to close. The size of the holes of the solenoid inlet and outlet valves are typically approximately 0.090 inches in diameter. These holes are large enough to cause sufficient flow between the high pressure side of the valve and the diaphragm chamber and are large enough so that the solenoid valves are not easily obstructed by contaminants or debris in the fluid line. The power for operating the solenoid is typically supplied by a valve control unit which is in turn connected to a standard power source such as 110 volt AC. The relatively large amount of power required to operate the solenoids, especially in a system with numerous valves, virtually requires that the control unit be connected to a constant source of power such as power provided by a utility company as opposed to connecting to battery power or solar power. This increases the installation expense due to the cost of running the power lines to the control unit. This expense is even higher when the control unit is located in a remote area.

A need therefore exists for an electronically actuated fluid valve that consumes a very low amount of power when the valve is being opened or closed, that does not require utility company power, and that does not consume any power when the valve is in the opened or closed position.

BRIEF SUMMARY OF THE INVENTION

The present invention is a low power, double primary fluid valve actuator assembly that uses phase-locked microvalves with protective filters to reduce the amount of electrical energy necessary to open and close the main or secondary fluid valve to which it is attached. The microvalves are phaselocked, i.e., arranged such that when a first microvalve is open, a second microvalve is closed and when a first microvalve is closed, the second microvalve is open.

In operation, there is an opening in the high pressure side of a fluid line that is connected by a stand pipe separator to a three stage replaceable water filter. The low flow of water through the stand pipe allows for gravity separation of particles denser than water. The purpose of the three stage water filter is to filter out all particles greater in size than 0.002 inches, and all magnetic particles so that no debris or contaminants will clog the microvalves. The filter contains a cobalt samarium magnet which effectively traps water-borne magnetic particles that would otherwise accumulate in or around the magnetic elements of the microvalve actuator and cause clogging or malfunction.

After the water passes through the filter assembly, it travel to the inlet of the first microvalve. If the first microvalve is open, water passes through the first microvalve to a junction. At the junction the water passes in one direction to the inlet of the second microvalve which is closed. The water also travels in a second direction through a doughnut filter and into the diaphragm chamber. This brings the water pressure in the diaphragm chamber to the same pressure as that of the high pressure side of the fluid line. This pressure equilibrium, together with a diaphragm spring located in the diaphragm chamber keeps the diaphragm in the closed position and the valve effectively shut off.

When the fluid valve is to be opened, a small electronic signal is sent from a low power controller to an electromagnetic plunger arrangement as described in co-pending application, Ser. No. 253,858, previously incorporated by reference, which causes the first microvalve to close and the second microvalve to open. When this happens, the diaphragm chamber is connected directly to the atmosphere causing the pressure in that chamber to drop to atmospheric pressure. The imbalance in pressure between the front and back side of the diaphragm causes the diaphragm be pushed to the open position and fluid to flow through the valve. No electrical power is necessary to keep the actuator assembly locked in either the opened or closed position.

When the fluid valve is to be closed, another small electronic pulse is sent to the electromagnetic plunger assembly causing the first microvalve to open and the second microvalve to close. This directly connects the diaphragm chamber to the high pressure side of the fluid line causing the pressure on both sides of the diaphragm to be equal. This allows the diaphragm to be pushed closed by a spring located in the diaphragm chamber thereby shutting off the flow of fluid. The only electrical power necessary to cause the opening and closing of the fluid valve is the initial electronic pulse from the low power control unit. The amount of force required to open and close the microvalves is greatly reduced due to the small size of the microvalve inlet holes which are approximately 0.013 of an inch in diameter. With this size of opening, the force used to open and hold open the valve is approximately a 20.0 grams and the force used to close the valve against 200 PSI of pressure is approximately 20.0 grams. The small amount of force required to open and close the valves greatly reduces the power requirements for the electromagnetic actuator assembly.

The passageways connecting the various chambers are of subcritical cross-sectional dimensions so that air bubbles are unable to avoid being pushed along by the water flow and the fluid outlets of the chambers are at the top of the chambers so that the system is self purging. Therefore it is an object of the present invention to provide valve actuator assembly that requires very low amounts of power to open and close a pressurized fluid line such as those used in sprinkler, irrigation or similar systems.

It is also an object of the present invention to provide an effective filtration system arrangement for microvalves thereby eliminating potential malfunctions caused by clogging of the microvalves either by contaminants carried by the operating fluid, or that may be present in the assembly before use as a result of manufacturing processes.

Additional objects and features of the invention will appear from the following description in which the preferred embodiments of the invention have been set forth in detail in conjunction with the drawings.

DETAILED DESCRIPTION OF THE INVENTION

A preferred embodiment of the present invention is a dual microvalve and filter primary actuator assembly that requires extremely small amount of electrical energy to cause a much larger fluid valve to open and close. The amount of force required to open and close the microvalves is greatly reduced by reducing the size of the microvalve holes to approximately 0.013 inches in diameter. With microvalves of this size, approximately 0 grams of force are needed to open the valve and 12 grams of force are needed to close the microvalves when the high pressure side of the fluid line is at 200 psi.

In operation, there is an opening in the high pressure side of the fluid line which is connected by sand pipe to a 3 stage filter which filters out particles larger than 0.002 inches in size as well as all magnetic particles. The fluid passes through the filter and through the first microvalve where it is connected to the second microvalve and the diaphragm chamber of the fluid valve. The microvalve arrangement involves two valves which are connected such that when the first valve is open the second valve is closed and vice versa. When the first microvalve is open, the diaphragm chamber is connected directly to the high pressure side of the fluid valve thereby keeping the fluid valve in the closed position. When the first microvalve is closed and the second microvalve is opened, the diaphragm chamber is connected directly to atmospheric pressure causing a pressure imbalance that opens the fluid valve. This microvalve arrangement requires only minute amounts of physical force to open and close much larger fluid valves such as on 2 inches valves used for sprinkler, irrigation, or similar systems.

The construction of the valve actuator assembly as well as its operation will now be discussed with reference to FIG. 1.

Figure 1:
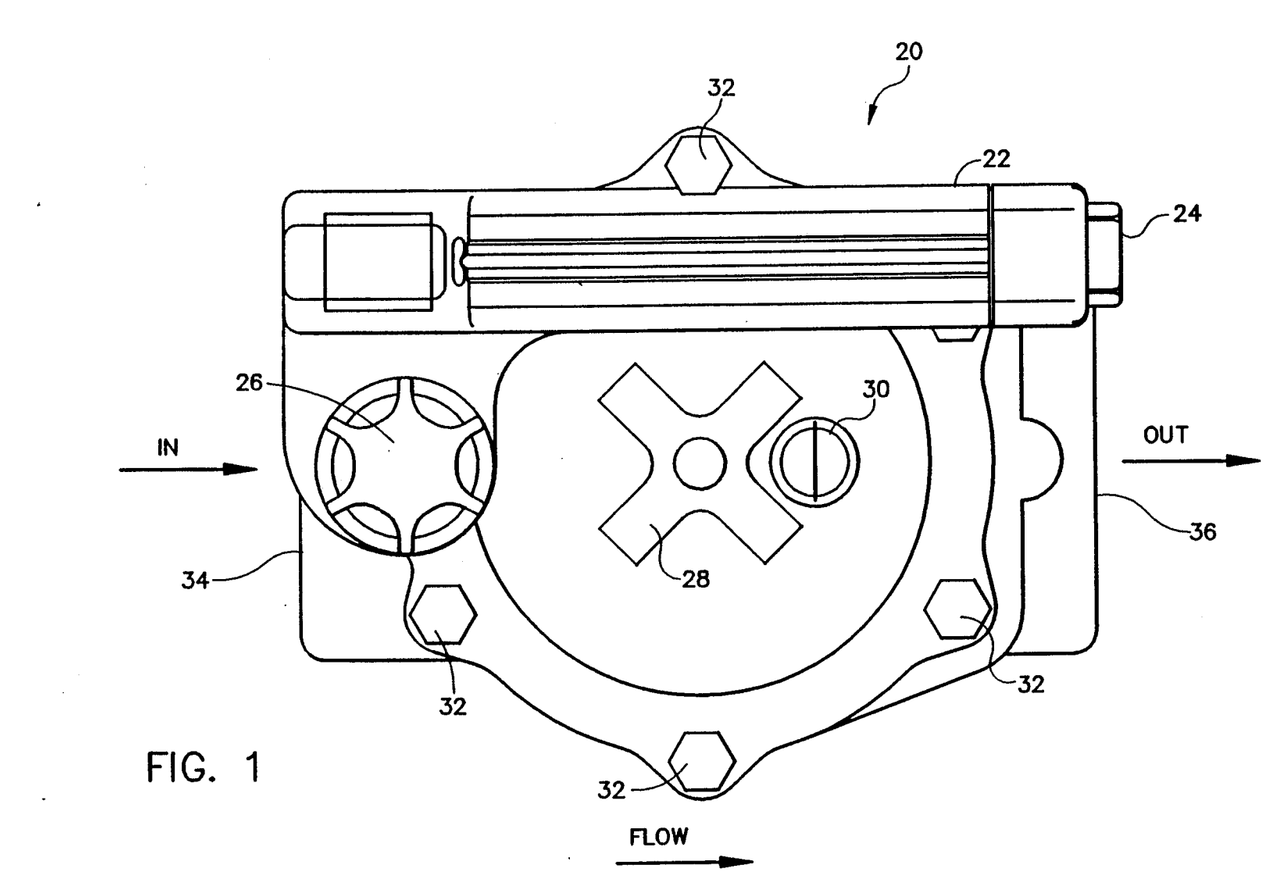
FIG. 1 is a top view of a fluid valve.

FIG. 1 shows a top view of a fluid valve 20. The fluid valve 20, has a valve actuation assembly housing 22, an actuator outlet 24, a filter assembly 26, a manual valve opener 28, a purge valve 30, bolts 32, a fluid valve inlet 34 and a fluid valve outlet 36.

The filter assembly 26 is connected to the high pressure side, or inlet side 34, of the fluid valve 20. Water flows through the filter assembly 26 and into the valve actuation assembly located in housing 22. From there the fluid flows to a diaphragm chamber (not shown) if the fluid valve 20 is closed. When the fluid valve 20 is open, water passes from the inlet 34 through the valve 20 and out of the valve at the valve outlet 36. Further operation of the valve will now be discussed with reference to FIG. 2.

Figure 2:
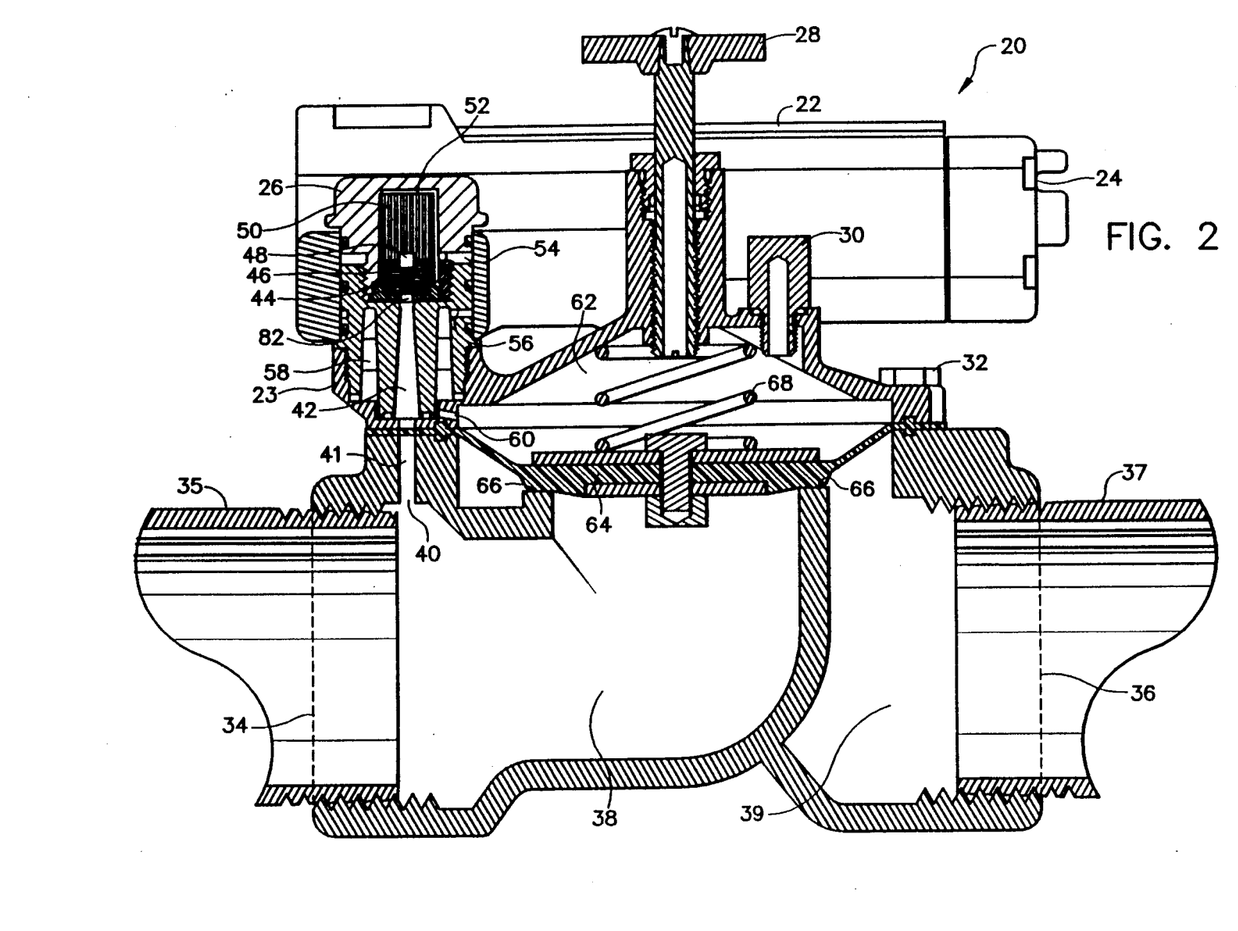
FIG. 2 is a side, cross-section view of the fluid valve and the filter.

FIG. 2 shows a cross section side view, along line 2—2 of FIG. 1, of an embodiment of the present invention. High pressure water flows through a pipe 35 to the fluid valve inlet 34. This fills the area 38 with high pressure water which is typically 150 lbs per square inch in an irrigation system.

Figure 3:
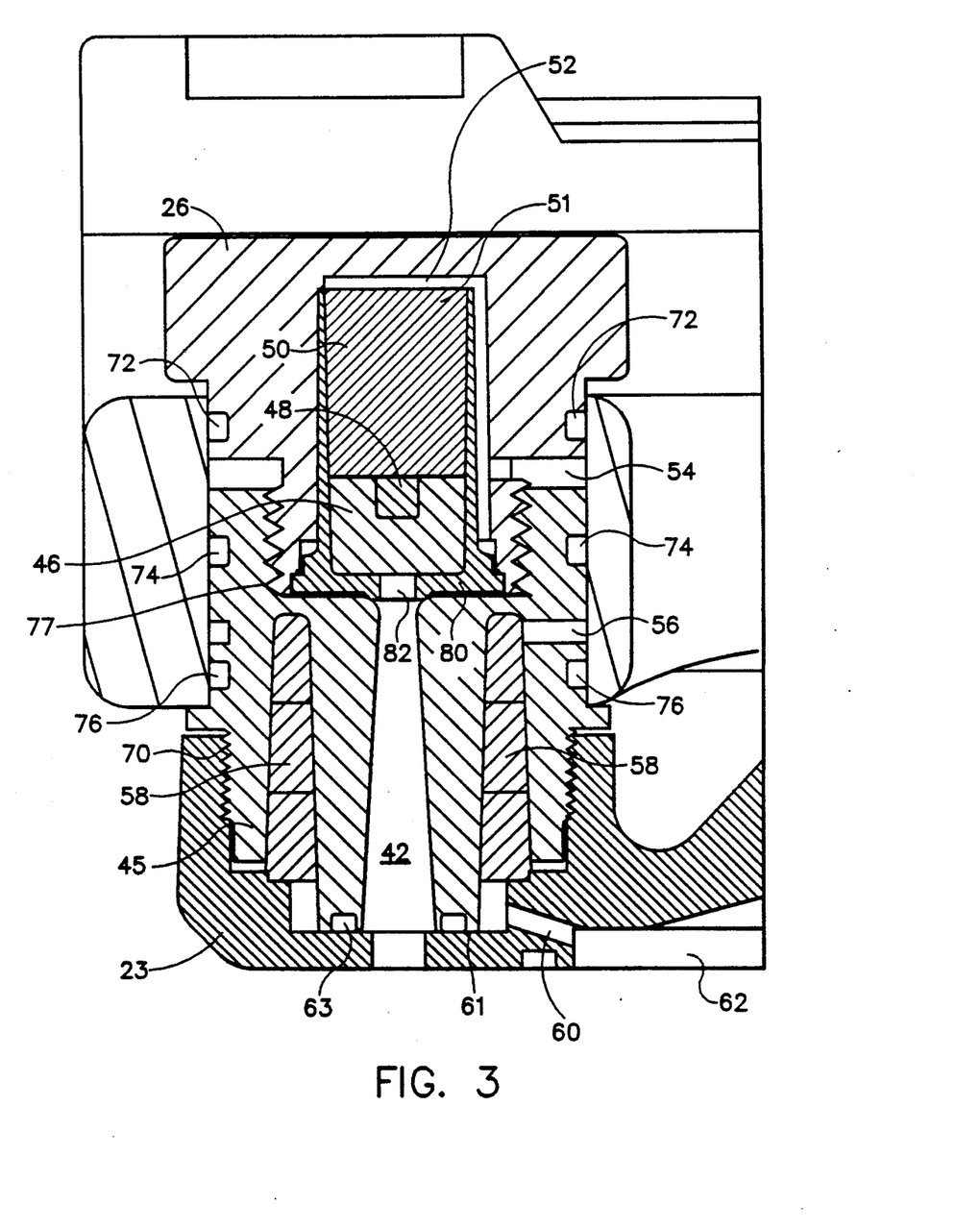
FIG. 3 is a cross section view of the filter as installed in the fluid valve.

High pressure water then passes through an inlet 40 into a channel 41 which in turn leads to a stand pipe 42. The stand pipe 42 is an important part of the filtering arrangement because it greatly reduces the need for high-capacity retention of contaminant particles in the filter media. Particles larger than approximately 0.106×0.106×0.106 inch in size are unable to enter the filter assembly 26. The stand pipe 42 is in a vertical position with respect to the ground and uses gravity and the tapered restricted flow of water to further reduce the number of particles that enter into the filter media assembly 26. The flow rate through the stand pipe is very small and allows for gravity separation of particles denser than water wherein such particles will fall back out into the main valve flow. A more detailed view of the filter arrangement 26 is shown in FIG. 3 which will now be discussed. Other factors shown in FIG. 2 will be discussed later.

FIG. 3, a cross section of the filter assembly 26, shows standpipe 42 which leads into inlet hole 82 at the base of the filter assembly 26. Water flows through inlet hole 82 into a filter area which houses filters 46 and 50. The filter area also houses a magnet 48, which is a cobalt samarium magnet. Filter 46 is a course mesh reticulated foam filter designed to filter out particles greater than 0.03 inches in size. Filter 50 is the main filter and is a Porex coarse-grade high density polyethylene filter designed to filter out particles larger than 0.002 inches in size. The cobalt samarium magnet 48 is designed to attract all remaining magnetic particles and prevent them from entering and clogging the magnetic structures present in the microvalve actuators. The cobalt samarium magnet is approximately 0.118 inches in diameter and 0.118 inches long and is nickel plated for corrosion resistance with a typical residual magnetic field strength of $10^6$ gauss. Other magnet materials such as ALNICO 5 will also work.

When water reaches the top area 51 of the filter, it flows into channel 52 and out through a filter outlet 54. By the time the water reaches filter outlet 54 all particles of size 0.002 inches or larger, and all magnetic particles have been removed by the filter.

As water flows from the filter outlet 54 it flows into the valve actuator assembly which will be described later. As the water exits the valve actuator assembly it enters passage 56 and then passes through a donut filter 58 to passage 60 and then into a diaphragm chamber 62. The purpose of the donut filter 58 is to remove any particles that may have been introduced into the valve actuator assembly during the manufacturing process. It also filters water coming from the diaphragm chamber 62 when there is reverse flow from that chamber back through the donut filter as will be described later. The donut filter 58 is made of reticulated foam mesh and is designed to filter out particles down to 0.03×0.03×0.03 inch in size. Other aspects of the filter assembly are also shown in FIG. 3. For instance the stand pipe and donut filter assembly 45 is screwed into a metallic portion 23 of the fluid valve 20. The stand pipe and donut filter assembly 45 is shown screwed all of the way into the metallic portion 23 of valve 20. This is shown by threads 70. When the stand pipe and donut filter assembly 45 is fully screwed into the metallic portion 23 of the fluid valve 20, a bottom area 61 of the stand pipe assembly 45 rests against the metallic portion 23 of the fluid valve 20. A sealing ring such as a quad ring is placed in groove 63 effectively sealing the stand pipe area 42 from the outlet area 60 of donut filter 58.

The quad ring located in groove 63 is sufficiently compressed so that it can effectively seal the pressure of water located in stand pipe 42 from atmospheric pressure which is sometimes present in the outlet area 60. The stand pipe and donut filter assembly 45 is made of a U.V. inhibited, glass filled polycarbonate having these characteristics: aging resistance, chemical resistance, toughness and impact strength which make the stand pipe assembly rugged and durable. Quad rings are also located in grooves 72, 74, and 76. The quad ring in groove 76 prevents water in filter inlet 56 from escaping to an area outside the filter. The quad ring in groove 74 prevents water from filter outlet 54 from migrating to donut filter 56 without passing through a microvalve as will be discussed later. Groove 72 also holds a quad ring. This groove is located in filter assembly 26. The quad ring in groove 72 prevents water from filter outlet 54 from escaping to the atmosphere. A closer view of filter assembly 26 is shown in FIG. 4 which will now be discussed.

Figure 4:
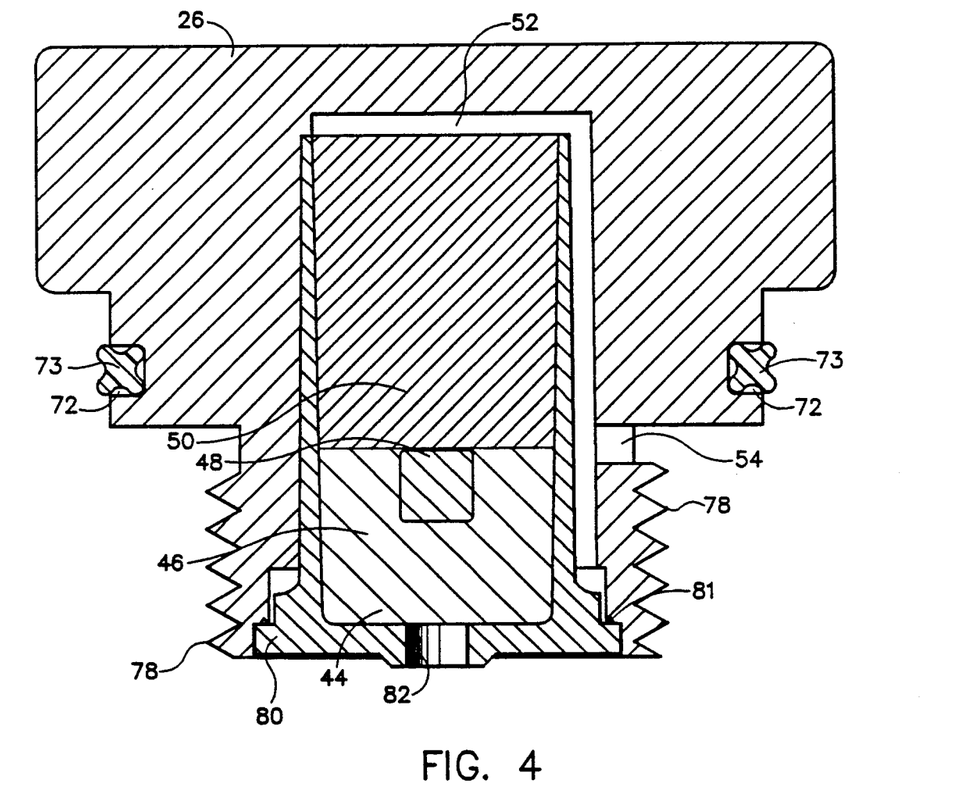
FIG. 4 is a cross section view of the removable portion of the filter.

FIG. 4 is a cross section view of a removable and replaceable filter assembly 26. When the filter assembly 26 is screwed into place, quad ring 73 effectively seals the high pressure water located in filter outlet 54 from the outside atmosphere. As shown in this cross section diagram, quad ring 73 fits into groove72. Quad rings similar to quad ring 73 are also located in grooves 74, 76 and 63 previously discussed. "O" rings or similar rings may be substituted for the quad rings. The filter assembly 26 is made from U.V. inhibited glass filled polycarbonate which has the same characteristics as the stand pipe and donut filter assembly 45 which make a durable and effective filter housing. During the manufacture of the filter of assembly 26, a filter cartridge 80, holding filters 46 and 50 as well as magnet 48, is inserted into the filter assembly 26 as shown in FIG. 4. The filter cartridge 80 is then ultrasonically bonded to the filter assembly 26. This bonding is facilitated by the indentation-groove arrangement shown at point 81. This ultrasonic bond effectively seals the filter cartridge 80 inside the filter assembly 26 wherein the only way for water to enter the filter assembly 26 is through opening 82. The only place for the water to exit the filter assembly 26 is through filter outlet 54. The filter assembly 26 has a threaded area 78 which is threaded into threaded area 77 of stand pipe and donut filter assembly 45 as shown in FIG. 3. The filter cartridge 80 is made of U.V. inhibited, glass filled polycarbonate having the characteristics previously described. In normal operation, if a filter becomes clogged, it can be replaced by shutting down the high pressure side of the water line 35, unscrewing filter assembly 26 and replacing it with a new filter assembly 26.

Figure 5:
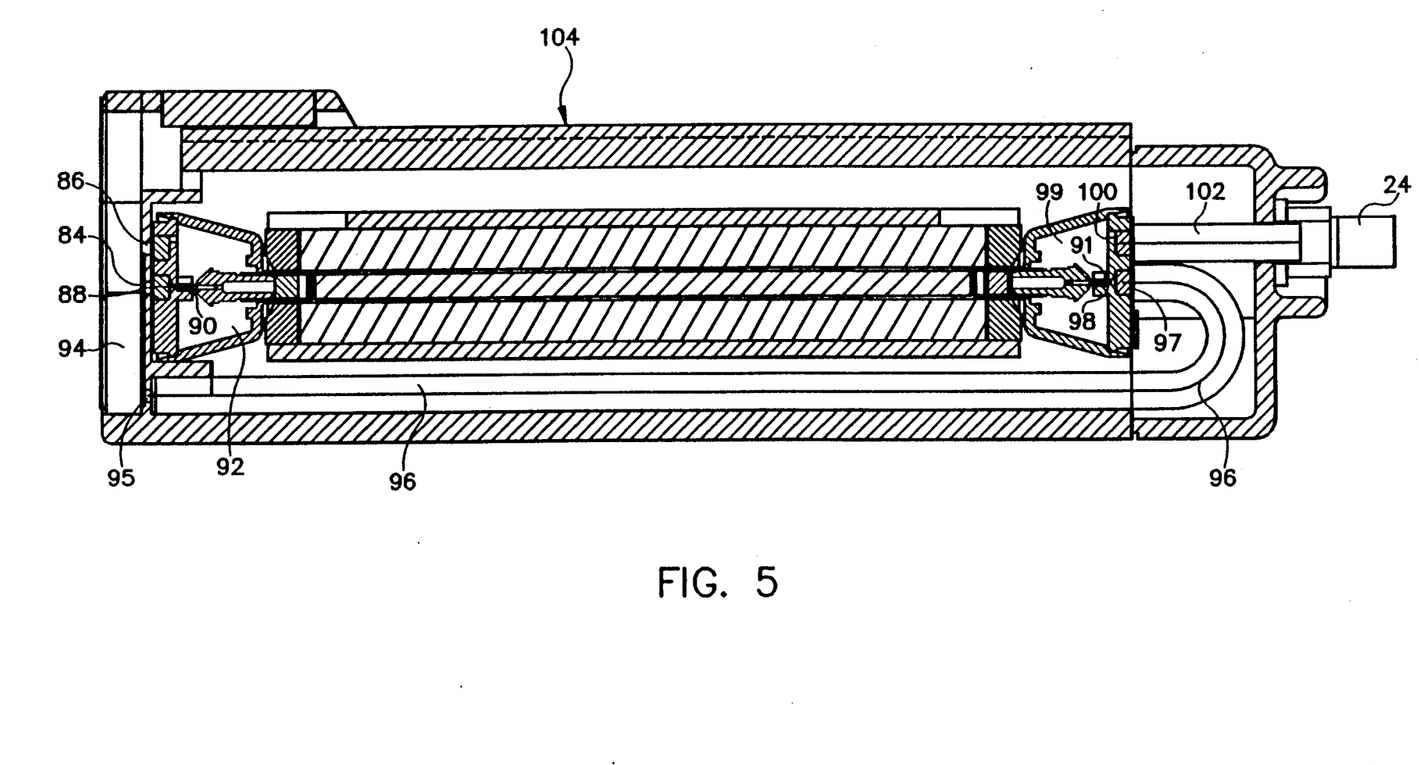
FIG. 5 is a cross section view of the valve actuator assembly and associated fluid circuits.

The operation of the microvalve actuator assembly 104 will now be discussed with reference to FIGS. 2 and 5. FIG. 2 shows the filter outlet 54. This outlet 54 is directly coupled to microvalve inlet 84 (FIG. 5). As water passes from the filter outlet 54 it enters into microvalve 84. The valve actuator assembly 104 has two microvalves, a primary microvalve in 88 and a primary microvalve out 98. The microvalves 88 and 98, as shown in FIG. 5, have valve holes that are laser drilled to approximately 0.013 inches in diameter. The microvalve seats are cylindrical and are closed by small spheroids 90 which rests against the seats of the microvalves 88 and 98. When microvalve 88 is in the closed position, microvalve 98 is in the open position. Conversely when microvalve 88 is in the open position microvalve 98 is in the closed position. The detailed structure of these valves will be further described later with reference to FIGS. 6, 7 and 8.

Since the holes of microvalves 88 and 98 are approximately 0.013 inches in diameter, it takes approximately 12 grams of force to effectively close these valves against a pressure of 200 pounds per square inch. A closing force of 20 grams is used to insure that the valve closes and stays closed. Different size valve openings in the range of 0.050 inches to 0.005 inches will also work with attendant increase in required actuation force. Also, the microvalves seats may be square, triangular or the other shapes than the preferred circular shape shown. In operation, when microvalve 88 is open and microvalve 98 is closed, water passes through chamber inlet and assembly filter 84, past the spheroid 90 and into chamber 92. The assembly filter is a 0.002" polyester mesh that is installed in the actuator assembly in a clean room environment and served to remove particles that may be trapped in the assembly during manufacturing. Water then passes through chamber 92, through chamber outlet and assembly filter 86 and into channel 94. At this point, the water passes from channel 94 through opening 95 into channel 96 and then to the microvalve inlet and assembly filter 97 of microvalve 98. Since microvalve 98 is closed, water stops at this point. While the actuator assembly 104 is in this position, water also flows from the channel 94 to the doughnut filter inlet 56 as shown in FIG. 2. With reference to FIG. 2, the high pressure water passe through the doughnut filter 58 and into the passage 60 which in turn allows the high pressure water to flow into the diaphragm chamber 62. As the water in the diaphragm chamber 62 equalizes to that of the high pressure area 38 of valve 20, diaphragm chamber 62 is pushed closed by spring 68 causing the diaphragm 64 to seat on the area 66. In this state, the fluid valve 20 is in the closed position and water cannot pass from high pressure side 38 to low pressure side 39. When the valve 20 is first put in service, purge valve 30 is opened to allow trapped air to be purged from chamber 62. If air is trapped in chamber 62 then the valve 20 will not shut effectively.

To open the valve, an electronic signal is sent to the microvalve actuator assembly 104 causing the microvalves 88 and 98 to reverse their position. Thus microvalve 88 goes from the open to the closed position and microvalve 98 goes from the closed to the open position. With the microvalves in this position, the water in chamber 62 starts to flow out through passage 60, through doughnut filter 58, to channel 56 as shown in FIG. 2. With reference to FIG. 5, water passes from the channel 56 to channel 94, through opening 95 to channel 96 to the valve opening and assembly filter 97 of the microvalve 98 which is open. Water passes by spheroid 91, through microvalve 98, into chamber 99 and out through the opening 100. From opening 100 the water passes through channel 102 to outlet 24 and into the atmosphere. Thus, the diaphragm chamber 62 (FIG. 2) is now at atmospheric pressure and the fluid in the high pressure side 38 of fluid valve 70 is at approximately 150 psi in a normal system. This pressure differential causes the diaphragm 64 to be pushed in an upward direction compressing spring 68 and allowing water to pass between diaphragm 64 and edges 66 into low pressure side 39 and out through valve opening 36. The valve 20 is now in the on position and water is flowing through the valve. To close the valve, an electronic pulse is sent to the microvalve actuator assembly 104 which causes microvalve 88 to open and microvalve 98 to close. When this happens, the chamber 62 is disconnected from the atmospheric pressure and is directly connected to the high pressure side 38 of fluid valve 20. Thus, water from the high pressure side 38 travels through opening 40, through channel 41, through stand pipe 42, through filter assembly 26, to filter outlet 54 where it enters microvalve inlet and assembly filter 84, and passes through microvalve 88. Fluid than enters the chamber 92, passes through microvalve outlet and filter assembly 86, and into channel 94 as show in FIG. 5. With reference to FIG. 2, water passes from channel 94 into inlet 56 through doughnut filter 58 through channel 60 and into diaphragm chamber 62. This causes the pressure in the diaphragm chamber 62 to equalize with the pressure on the high pressure side 38 of fluid valve 20. The extra force applied to the diaphragm 64 by spring 68 causes the diaphragm 64 to be pushed against the area 66 effectively sealing off the high pressure side of the valve 38 from the low pressure side 39. The valve is now closed.

At this point it should be noted that the passages from the filter assembly 45 to the actuator assembly 104 and through the microvalves 88 and 98 are of subcritical dimensions. The critical dimension is determined by the type of material used, the temperature of the water, and the purity of the water. In the present embodiment, for a sprinkler system using water passages made of polycarbonate plastic the critical diameter of the passages between the various chambers is 0.060". Passages larger than this will allow bubbles to travel backwards through the passages due to the effects of gravity. With passageways such as passage 52, 54, 60, 94, and 96 less than 0.060", bubbles will be forced to travel in one direction, regardless of the effects of gravity, when the valve is put into service. Another feature of the filter assembly and valve actuator assembly 104 is that each outlet passage for each chamber, with the exception of diaphragm chamber 62, is connected to the top of the chamber from which the fluid is exiting. This feature in connection with the subcritical dimensions of the connecting passages makes the system self purging. Therefore, any air trapped in chambers 92 or 99, for example, will be forced to exit the actuator assembly through outlet 24 making the system self purging. This is an important aspect of the invention in that the actuator assembly will cause chattering on oscillation of the main valve to which it is attached, unless the system is self purging.

Figures 6, 7, 8:
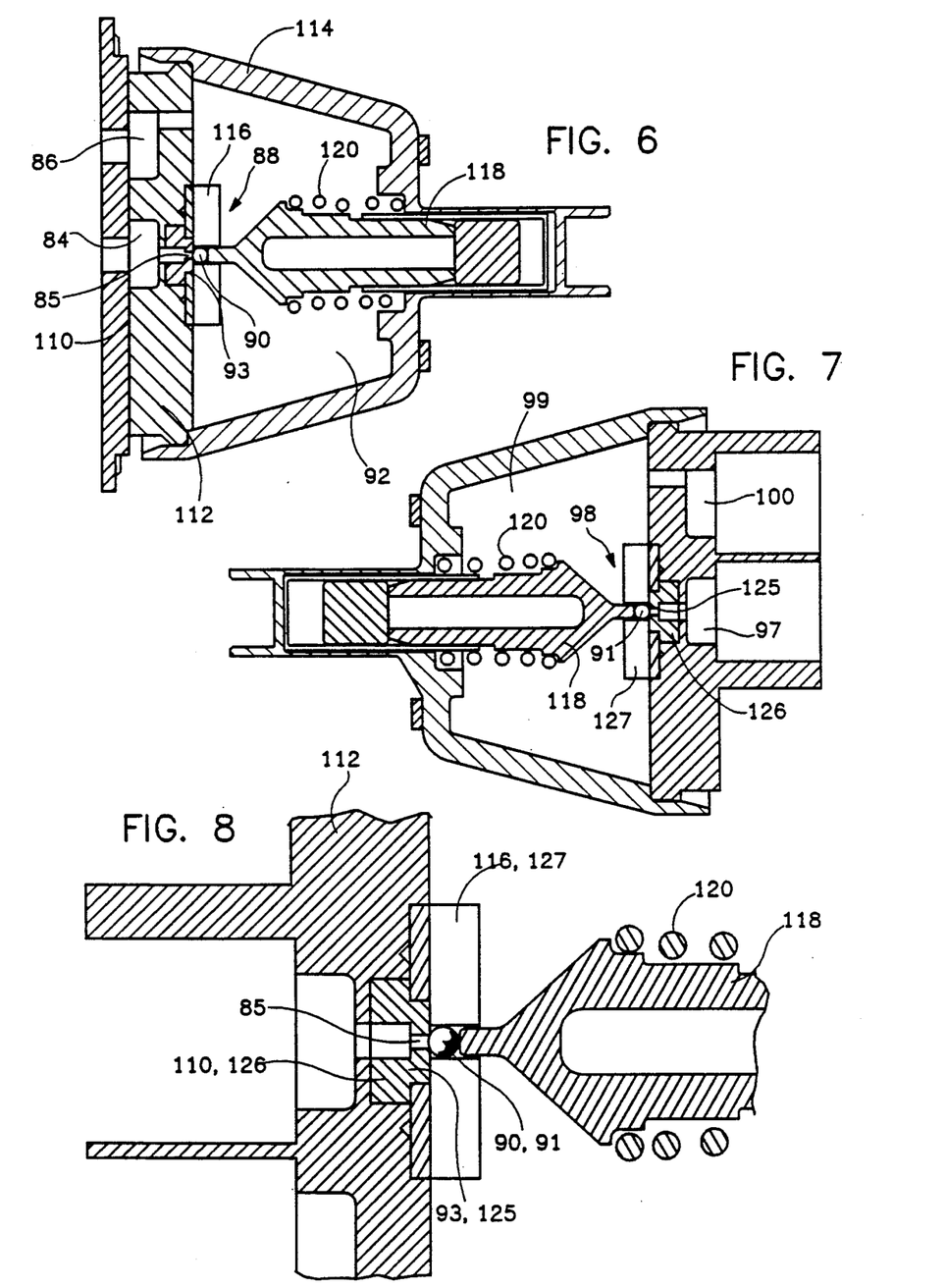
FIG. 6 is a side cross-section view of a microvalve.
FIG. 7 is a side cross-section view of a microvalve.
FIG. 8 is an enlarged view of a portion of the microvalves shown in FIGS. 6 and 7.

Another important aspect of the invention is that a molded elastomer duckbill valve is located at the outlet 24, FIG. 5. This duckbill valve prevents foreign matter, including insects from entering the system and clogging the outlet primary valve 98. Turning now to FIGS. 6, 7 and 8, FIG. 6 shows an enlarged view of the primary microvalve in assembly 88 and FIG. 7 shown an enlarged view of the primary microvalve out assembly 98. FIG. 8 is a further enlarged view of a portion of a microvalve assembly showing how spheroids 90 and 91 seat against valve seats 93 and 125 which in turn rests against a quad rings 110 and 126, respectively.

With reference to FIG. 6, guide coil 114 is made from GE HF 1110 polycarbonate as is the valve seat housing 112. The plunger assembly 118 is made of nylon and the spheroid 90 is made of Zirconia. The valve seat 93 is made from synthetic sapphire or ruby and has a 0.013" diameter hole 85 through the middle of the polished valve seat 93. The seat retainer 116 is made from polycarbonate. FIG. 6 is a primary valve in subassembly and FIG. 7 is a primary valve out subassembly.

FIG. 7 shows zirconia spheroid 91, sapphire seat 125, microvalve inlet 97, and seat retainer 126. The materials for the construction of this valve are the same as described with reference to FIG. 6.

FIG. 8 is a more detailed view of the microvalves. The plunger 118 holds the zirconia spheroid 90 (91) onto polished sapphire valve seat 93. Spring 120, also shown in FIGS. 6 and 7, holds the plunger 118 against the spheroid 90 (91), which in turn rests against the sapphire valve seat 93 (125). The spring 120 provides approximately 20 grams of force to close the valve. Since the normal force required to open the valve under pressure is essentially zero, the total force required to open the microvalve is approximately 20 grams of force. As previously discussed, the amount of force to close the valve with the aid of the spring force is approximately 0 grams.

The sapphire valve seat 93 and the zirconia spheroid 90 are hard materials that are corrosion resistant. This aids in keeping the microvalves clean from debris and the hardness of the materials eliminates perceptible wear on the valve seat 93 which could cause an enlargement of the valve seat and the hole 85 which would increase the amount of force necessary to close the valve.

It takes approximately 10 seconds for a 1" secondary valve to fully open from a fully closed position and approximately 10 seconds for a valve to fully close from the fully open position.

The small diameter of the microvalves 88 and 98 permit an electronic actuator assembly that consumes a very low amount of power. In turn, since the openings in the microvalves are so small, approximately 0.013 inches, it is critical that the water be filtered as described with reference to FIG. 3 and 4. To operate the valves with inlet openings larger than 0.050 would require more electricity than is practically available in an ambient light powered system. The small amount of force needed to seal the microvalves 88 and 98 from a water pressure force of approximately 150 psi makes it possible to open and close the microvalves 88 and 98 using only a small amount of force. If the force is generated through a latching electromagnetic means, only a minute amount of electrical power is necessary to cause the microvalves 88 and 98 to change position and remain in position. Now that the valves can be opened and closed with a small amount of power, it is possible to connect the valves to a control unit that it operated by ambient light energy, thereby eliminating the need for connecting the control unit to standard utility power. This reduces the expense of installation and also the amount of power consumed during the operation of the system on a normal basis. Fluid valves using an actuation system as described herein can be opened and closed with as little as 9.4 microwatts of power being applied for only 40 milliseconds, as opposed to approximately eight watts of power being required continuously to keep the solenoid of the prior art valve in the open position.

Valves using less power than the prior art solenoid valve as previously described also exist. However, these valves typically use approximately 6-8 watts of power to activate a self-latching solenoid to cause the valves of the actuation assembly to go from the open position to the closed position and vice versa. This amount of power consumption is too high to practically be used in the ambient light energized system as described in the co-pending application, Ser. No. 253,858, previously incorporated by reference.

The invention has been particularly shown and described with reference to preferred embodiments thereof, however it will be understood by those skilled in the art that the foregoing and other changes in form and detail may be made therein without departing from the spirit and scope of the invention.

What is claimed is:

1. In a primary valve actuator assembly for controlling the opening and closing of a fluid valve having
   valve means having an inlet, an outlet, a sealing means, and a fluid path between said inlet and outlet, said sealing means disposed in said fluid path and moveable in position for sealing and unsealing said inlet of said valve means from said outlet of said valve means,
   chamber means located on one side of said sealing means,
   bias means located in said chamber means for biasing said sealing means in position,
   filter means having an inlet and an outlet, the inlet of said filter means connected to the inlet of said fluid valve, said filter means for filtering particulate material,
   first microvalve means having an inlet and an outlet, said inlet of said first microvalve means being connected to the outlet of said filter means and the outlet of said first microvalve means being connected to said chamber means, said first microvalve means being controllable by mechanical force to selectively gate fluid from its inlet to its outlet, and
   second microvalve means having an inlet and an outlet, the outlet of said second microvalve means being connected to atmospheric pressure and the inlet of said second microvalve means being connected to said chamber means and said outlet of said first microvalve means, said second microvalve means being controllable by mechanical force to selectively gate fluid from its inlet to its outlet, and
   control means, controlling said first microvalve means and said second microvalve means jointly in tandem,
      for producing a first mechanical force for closing said first microvalve means and for opening said second microvalve means, therein making said chamber means to be at atmospheric pressure with said sealing means in position unsealing said fluid path, and
      for producing a second mechanical force for closing said first microwave means, and for opening said second microvalve means, therein making said chamber means to be connected to said inlet of said fluid valve with said sealing means is in position sealing said fluid path,
the improvement wherein said control means comprises:
   an electromagnetic actuator, having an electromagnet and a permanent magnet, for developing, at times, each of the first and the second mechanical forces with and from both the electromagnet and the permanent magnet, the electromagnetic actuator
      momentarily converting in its electromagnet a momentary first-direction electrical current in order to produce the first mechanical force momentarily with the electromagnet, thereafter continuing to produce this first mechanical force solely with its permanent magnet without consumption of electrical power, and at other times momentarily converting in its electromagnet a momentary second-direction electrical current in order to produce the second mechanical force momentarily with the electromagnet, thereafter continuing to produce this second mechanical force solely with its permanent magnet without consumption of electrical power;

wherein the first and the second mechanical forces for respectively unsealing and sealing the fluid path are but momentarily produced from electrical current.

2. The valve actuator assembly of claim 1 wherein:

said filter means comprises two filter materials, the first filter material being reticulated foam and the second filter material being high density polyethylene.

3. The valve actuator assembly of claim 2 wherein:

said first microvalve and said second microvalve have valve inlet openings in the range of 0.010 to 0.040 inches.

4. The valve actuator assembly of claim 3 including, doughnut filter means located in a fluid path between the outlet of said first microvalve means and the inlet to said chamber means, said doughnut filter means being made of reticulated foam.

5. The actuator assembly of claim 1 including, doughnut filter means located in a fluid path between the outlet of said first microvalve means and the inlet to said chamber means.

6. The valve actuator assembly of claim 1 wherein said electromagnetic actuator comprises:

an electromagnet having a first polepiece and a second polepiece separated by a gap, said electromagnet being energizable by a first-direction electrical current to produce a first-type magnetic pole at its first polepiece, a second-type magnetic pole at its second polepiece, and a first electromagnetic field therebetween;

a permanent magnet having a second-type permanent magnetic pole oriented towards the electromagnet's first polepiece, a first-type permanent magnetic pole oriented oppositely, and a magnetic field therebetween, said permanent magnet being situated in the gap and being movable therein from a first position proximate the electromagnet's second polepiece where the magnetic field substantially shunts this second polepiece to a second position proximate the electromagnet's first polepiece where the magnetic field substantially shunts this first polepiece, said permanent magnet producing by such movement a first mechanical force in the direction towards the electromagnet's first polepiece.

7. The valve actuator assembly according to claim 6 wherein said electromagnet of said electromagnetic actuator is further energizable by a second-direction electrical current to produce a second-type magnetic pole at its first polepiece, a first-type magnetic pole at its second polepiece and a second electromagnetic field therebetween;

said permanent magnet being further moveable from the second position to the first position in response to the second electromagnetic field, said permanent magnet producing by such movement a second mechanical force in the direction away from the electromagnet's first polepiece.

8. The valve actuator assembly according to claim 7 wherein said electromagnetic actuator is further comprising:

means for biasing said permanent magnet along an axis of its movement from its second to its first position.

9. The valve actuator assembly according to claim 8 wherein the said biasing means of said electromagnetic actuator biases the permanent magnet in the direction of its movement from the second to the first position.

10. The valve actuator assembly according to claim 8 wherein the means for biasing of the electromagnetic actuator comprises:

a spring.

11. The valve actuator assembly according to claim 10 wherein the electromagnetic actuator is further comprising:

a stop means for limiting said spring to bias the movement of said permanent magnet only over a range of movement that is proximate to said magnet's second position and does not extend so far as said magnet's first position.

12. The valve actuator assembly of claim 1 wherein said electromagnetic actuator comprises:

an electromagnet substantially in the shape of a pot electromagnet having an outer, second, polepiece extended radially inward until terminating proximately and substantially perpendicular to the butt end of an inner, first, polepiece, the electromagnet being energizable by an electrical current to produce an electromagnetic field in a gap between its first polepiece and its second polepiece; and a permanent magnet, located in the gap and having its magnetic poles oriented towards the electromagnet's polepieces, the permanent magnet being moveable in response to the electromagnetic field between a first position proximate the electromagnet's second polepiece and a second position the electromagnet's first polepiece, the permanent magnet providing by such movement a motive force.

13. The valve actuator according to claim 12 wherein the electromagnet of the electromagnetic actuator is energizable by electrical currents of opposite direction to produce electromagnetic fields of opposite magnetic polarity in the gap; and wherein the permanent magnet is moveable bidirectionally between the first and the second positions in response to the electromagnetic fields of opposite polarity.

14. The valve actuator according to claim 13 wherein the moveable permanent magnet of the electromagnetic actuator is coupled by its own magnetic flux to the proximate second polepiece at its first position, and to the proximate first polepiece at its first position, and to the proximate first polepiece at its first position, so that, by this magnetic flux coupling, the permanent magnet forcibly resists movement from its first, or its second, position when the electromagnet is not energized.

15. The valve actuator according to claim 12 wherein the electromagnetic actuator is further comprising:

biasing means for force biasing at least a portion of the movement of the permanent magnet between its first and its second positions.

16. The valve actuator according to claim 15 wherein the biasing means of the electromagnetic actuator force biases the movement of the permanent magnet in a direction from its second to its first position.

17. The valve actuator according to claim 16 wherein the biasing means of the electromagnetic actuator force biases the movement of the permanent magnet over a portion of its movement path including its second position but not including its first position.

18. A valve actuator for use in controlling the opening and closing of a fluid valve which has valve means having an inlet, and outlet, a sealing means, and a fluid path between said inlet and outlet, said sealing means disposed in said fluid path for sealing and unsealing said inlet from said outlet, chamber means located on one side of said sealing means, bias means located in said chamber means for biasing said sealing means in position, filter means having an inlet and an outlet, the inlet of said filter means connected to the inlet of said fluid valve, said filter means for filtering particulate material, first microvalve means having an inlet and an outlet and actuatable to selectively gate fluid therebetween, said inlet of said first microvalve means being connected to the outlet of said filter means and the outlet of said first microvalve means being connected to said chamber means, and second microvalve means having an inlet and an outlet and actuatable to gate fluid therebetween, the outlet of said second microvalve means being connected to atmospheric pressure and the inlet of said second microvalve means being connected to said chamber means and said outlet of said first microvalve means, said actuator comprising:

an electromagnetic actuator having and electromagnet and a permanent magnet for converting in its electromagnet an electrical current into a mechanical force so as to control said first microvalve means and said second microvalve means jointly in tandem in order both to (i) close said first microvalve means and open said second microvalve means, therein to connect said chamber means to atmospheric pressure with said sealing means in position unsealing said fluid path, and, at other times, to (ii) open said first microvalve means and close said second microvalve means, therein to connect said chamber means to said inlet of said fluid valve with said sealing means in position sealing said fluid path, and, at a later time, for producing with its permanent magnet the same mechanical force, now in order both to (i) maintain said first microvalve means closed and said second microvalve means open, therein maintaining said chamber means connected to atmospheric pressure with said sealing means in position unsealing said fluid path without consumption of electrical energy, and, at other times, (ii) maintain said first microvalve means open and said second microvalve means closed, therein to maintain said chamber means connected to said inlet of said fluid valve with said sealing means in position sealing said fluid path again without consumption of electrical energy;

wherein the mechanical force to open and to close the first and the second microvalve means is produce in an electromagnet by conversion of electrical energy but the mechanical force to maintain the first and the second microvalve means in either their open or their closed positions is derived from a permanent magnet without consumption of electrical energy.

19. The valve actuator of claim 18 usable with a fluid valve that further includes a filter located at said inlet of said first microvalve means and at said inlet of said second microvalve means so as to substantially filter such contaminants from the fluid path as are otherwise prone to clog any moving component of the valve actuator, the valve actuator further comprising:

a piston that moves under magnetic forces produced both by the electromagnet and by the permanent magnet.

* * * * *